(12) United States Patent
Lin

(10) Patent No.: US 6,749,334 B2
(45) Date of Patent: Jun. 15, 2004

(54) EAR THERMOMETER PROBE STRUCTURE

(75) Inventor: Kevin Lin, Hsin-Chu (TW)

(73) Assignee: Radiant Innovation Inc., Hsin-Chu (TW)

( * ) Notice: Subject to any disclaimer, the term of this patent is extended or adjusted under 35 U.S.C. 154(b) by 0 days.

(21) Appl. No.: 10/215,002

(22) Filed: Aug. 9, 2002

(65) Prior Publication Data

US 2004/0028116 A1 Feb. 12, 2004

(51) Int. Cl.[7] .............................. G01J 5/04; G01K 1/16
(52) U.S. Cl. ..................................... 374/121; 374/131
(58) Field of Search ................................ 374/120, 121, 374/131, 194, 200, 208, 158, 209; 600/474, 549

(56) References Cited

U.S. PATENT DOCUMENTS

| | | | | |
|---|---|---|---|---|
| 4,005,605 A | * | 2/1977 | Michael ....................... | 374/129 |
| 5,066,142 A | | 11/1991 | DeFrank et al. | |
| 5,293,877 A | * | 3/1994 | O'Hara et al. ............... | 600/549 |
| 5,325,863 A | | 7/1994 | Pompei | |
| 5,458,121 A | * | 10/1995 | Harada ........................ | 600/474 |
| 5,857,775 A | | 1/1999 | Vodzak et al. | |
| 5,871,279 A | | 2/1999 | Mooradian et al. | |
| 5,873,833 A | | 2/1999 | Pompei | |
| 5,991,652 A | | 11/1999 | Barthelemy et al. | |
| 6,076,962 A | | 6/2000 | Chen | |
| 6,109,782 A | * | 8/2000 | Fukura et al. ............... | 374/131 |
| 6,152,595 A | | 11/2000 | Beerwerth et al. | |
| 6,386,757 B1 | * | 5/2002 | Konno ........................ | 374/158 |
| 6,513,970 B1 | * | 2/2003 | Tabata et al. ............... | 374/131 |

* cited by examiner

Primary Examiner—Diego Gutierrez
Assistant Examiner—Lydia M. De Jesús
(74) Attorney, Agent, or Firm—Rosenberg, Klein & Lee

(57) ABSTRACT

An ear thermometer probe structure comprises a shell body. A hollow thermal absorption component is disposed in the shell body, and contacts several positioning points one the inner wall of the shell body. An air gap is formed at the part of the thermal absorption component not contacting the shell body. A wave guide is disposed in the thermal absorption component. The rear section of the wave guide tightly contacts the thermal absorption component, and the front section thereof is separated from the shell body by an air gap. A filter is disposed at the front end of the wave guide to let infrared rays be transmitted. An annular sealing pad is located between the filter and the top of the shell body. A sensor is disposed behind the wave guide and fixed on the thermal absorption component. The sensor is separated from the thermal absorption component and the wave guide by an annular air room.

13 Claims, 6 Drawing Sheets

EAR THERMOMETER PROBE STRUCTURE

FIELD OF THE INVENTION

The present invention relates to an ear thermometer probe structure and, more particularly, to an ear thermometer probe structure capable of resisting variation of temperature gradient and measuring with high accuracies.

BACKGROUND OF THE INVENTION

Recently, using ear thermometers to measure the eardrum temperature of infants has become a trend. Because the eardrum is located near the control center of body temperature (i.e., hypophysis) in the skull, and can obtain sufficient supply of blood flow from the carotid, any variation of temperature of the body will be manifested by the eardrum temperature. An ear thermometer utilizes infrared rays to measure heat released by the eardrum so as to obtain the accurate temperature. In addition to measure the true temperature of the body, using an ear thermometer to measure the eardrum temperature can dispense with inconvenience of measuring the anus temperature of infants for the parents, and also has the advantages of quickness, comfort, and convenience.

An ear thermometer usually has a probe structure to be stuck into the ear hole for measuring the eardrum temperature. The ear thermometer probe structure is the main structure affecting the accuracy of measurement. The whole design and assembly stability of the probe directly affect the reliability of an ear thermometer. Especially, stability of the optical path system and influence of thermal conductivity must be taken into account. Because an ear thermometer must be calibrated at a specific temperature when leaving the factory, once the relative positions of the optical path system is changed, transmittance and reflectance efficiency of infrared rays will be directly affected, resulting in erroneous calculation of the ear thermometer. The probe of an ear thermometer thus needs to have a very good vibration-proof capability. Moreover, because the temperature difference of a sensor and the measured object is measured when using infrared rays to measure the temperature, the temperature measured by the sensor will lose its reference value if the temperature of the sensor itself is vulnerable to external temperature in the design of thermal conductivity.

As shown in FIG. 1, a probe structure of a conventional ear thermometer is disclosed in U.S. Pat. No. 5,871,279. A probe 10 comprises a shell body 12 of low thermal conductance. A wave guide 14 is disposed and fixed in the shell body 12. The inner tube wall of the wave guide 14 is plated with gold to enhance reflectance. A filter 16 is disposed at the front end in the wave guide 14. The filter 16 is usually made of material like polypropylene (PP) or polyethylene (PE). Infrared rays are transmitted through the filter 16, are reflected in the wave guide 14, and then reach a sensor (not shown) disposed at the rear end of the wave guide 14. The reflected signal received by the sensor is then quantized into a value for display to obtain the temperature of the human body. In this disclosure, a metal piece 18 is annularly disposed between the rear sections of the shell body 12 and the wave guide 14 to ensure that the filter 16 will not be impacted to influence the optical path system when the probe 10 is impacted. Although this disclosure has a better vibration-proof effect, the disposition of the metal piece 18 lets external heat be more easily conducted to the wave guide 14, hence affecting the temperature of the sensor itself and resulting in incorrect measurement. Furthermore, because the filter 16 is made of material of low strength like PP or PE, once it is pieced by pointed objects to hollow and deform or even be penetrated through, the measured value will be too high notably and thus has no reference value.

As shown in FIG. 2, another probe structure of a conventional ear thermometer is disclosed in U.S. Pat. No. 5,857,775. In a shell body 12 of the probe, a filter 20 is disposed at the foremost end. A sealing pad 22, a collar 24, and a wave guide 14 are disposed behind the filter 20 in order, respectively. The wave guide 14 passes through the hollow regions of the sealing pad 22 and the collar 24 and tightly contacts them. The top end of the wave guide 14 shores up the filter 20. Epoxy 26 is then used to fix all the above components in the shell body 12. In order to accomplish sealing effect, all the components is first place into the shell body 12, and the epoxy 26 is then used to fix all the components in the shell body 12. However, this will increase the difficulty in practical embodiment. Moreover, the wave guide 14 directly presses the filter 20. The sealing pad 22 is neither placed between the filter 20 and the wave guide 14 nor placed between the filter 20 and the shell body 12. Therefore, the sealing pad 22 has a very bad vibration-proof effect. Crack of the filter 20 may easily arise when collision occurs.

In the disclosure of U.S. Pat. No. 6,076,962, the wave guide is omitted, and the sensor is disposed at the foremost end in the shell body of the probe to directly detect heat released by the ear drum so as to reduce error. However, the external environment will directly heat the sensor to let variation of the temperature of the sensor itself be more, and the sensor will be directly and momentarily heated by the ear hole. These two factors will increase variation of temperature gradient to affect the sensor. Therefore, the measured value after comparison of the temperature detected by the sensor with the temperature of the sensor itself is not the real temperature of the human body.

Accordingly, the present invention aims to propose an ear thermometer probe structure having vibration-proof capability and capable of resisting variation of temperature gradient to resolve the problems and drawbacks in the prior art.

SUMMARY OF THE INVENTION

The primary object of the present invention is to provide an ear thermometer probe structure, wherein a sensor in the probe structure is located in a sealed air room to reduce the influence of variation of temperature gradient to the sensor. The sensor will thus have a very high temperature stability to effectively enhance the accuracy of measurement.

Another object of the present invention is to provide an ear thermometer probe structure, wherein a filter at the front end in the probe structure is made of silicon chip material with high transmittance of infrared rays to have high strength. Therefore, the probe structure will not be easily pieced through, is airtight and waterproof, can be cleaned with alcohol, and can be used without probe covers.

Another object of the present invention is to provide an ear thermometer probe structure, wherein a sealing pad is disposed at an appropriate position to exactly achieve vibration-proof, water-proof, and dust-proof effects.

According to the present invention, an ear thermometer probe structure comprises a shell body, a hollow thermal absorption component, a wave guide, a filter, an annular sealing pad, and a sensor. The shell body has a narrow front end and a wider rear end to form a probe shape. At least a positioning point is disposed on the inner wall of the shell body. An annular flange is formed at the top of the shell body. The hollow thermal absorption component is disposed in the shell body, and contacts the positioning point of the shell body. An air gap is formed at the part of the hollow thermal absorption component not contacting the shell body. The wave guide is disposed in the hollow portion of the thermal absorption component. The rear section of the wave guide tightly contacts the thermal absorption component, and the front section thereof protrudes out of the thermal absorption component and is separated from the shell body by an air gap. The filter is disposed at the front end of the wave guide. The periphery of the filter contacts the shell body to let infrared rays be transmitted. The annular sealing pad is disposed at the front end in the shell body, and is located between the filter and the annular flange at the top of the shell body. The sensor is disposed behind the wave guide and is fixed on the thermal absorption component. An annular air room is disposed between the sensor and the thermal absorption component and the wave guide.

The various objects and advantages of the present invention will be more readily understood from the following detailed description when read in conjunction with the appended drawing, in which:

DETAILED DESCRIPTION OF THE PREFERRED EMBODIMENTS

The present invention discloses an ear thermometer probe structure, wherein a sensor in the probe has a high stability of temperature, and is not easily changed due to influence of external temperature, hence letting the measured value be more reliable and accurate.

Figure 1:
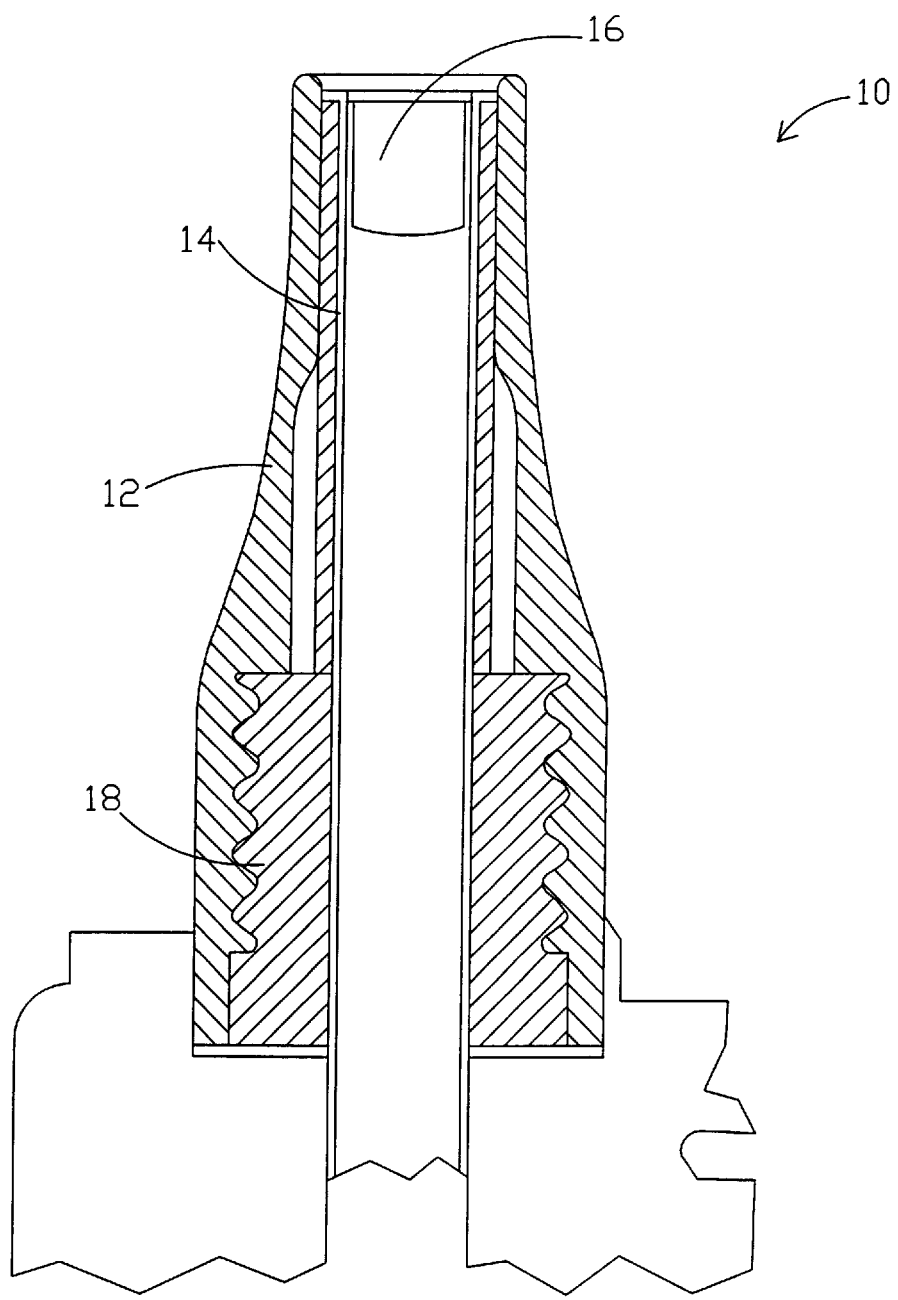
FIG. 1 is a diagram of a probe structure of a conventional ear thermometer.
Figure 2:
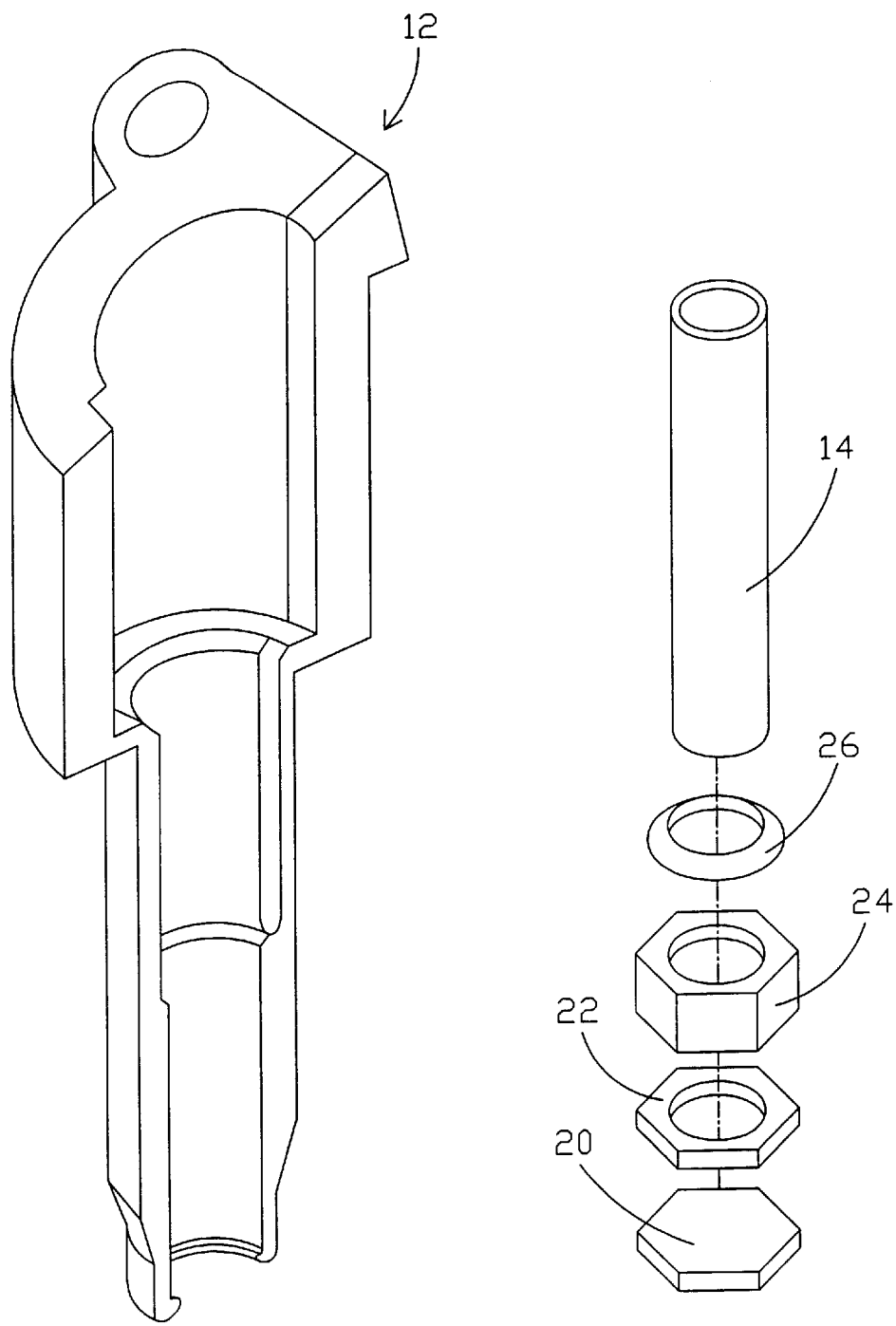
FIG. 2 is a diagram of a probe structure of another conventional ear thermometer.
Figure 3:
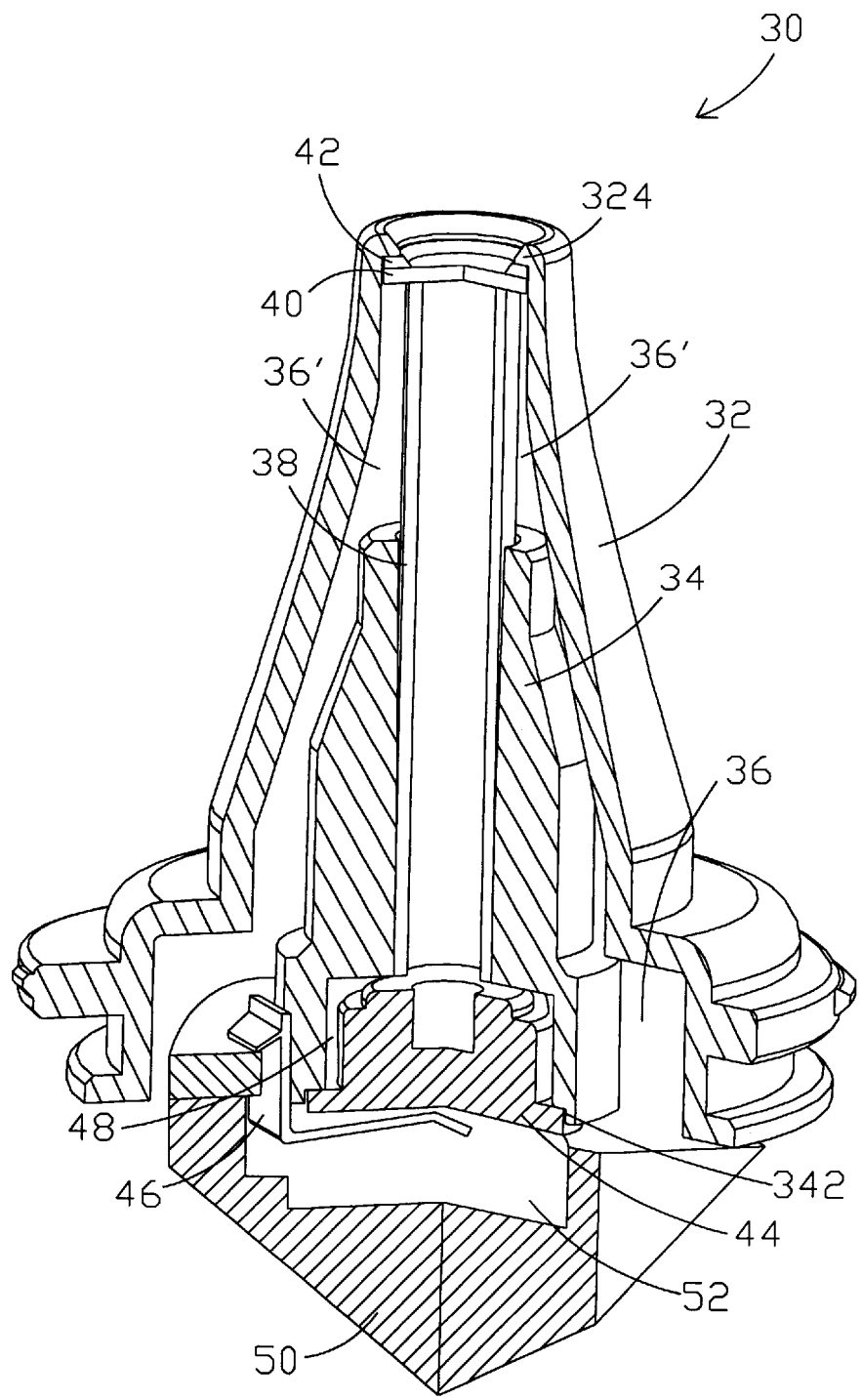
FIG. 3 is a perspective view of an ear thermometer probe structure of the present invention.
Figure 4:
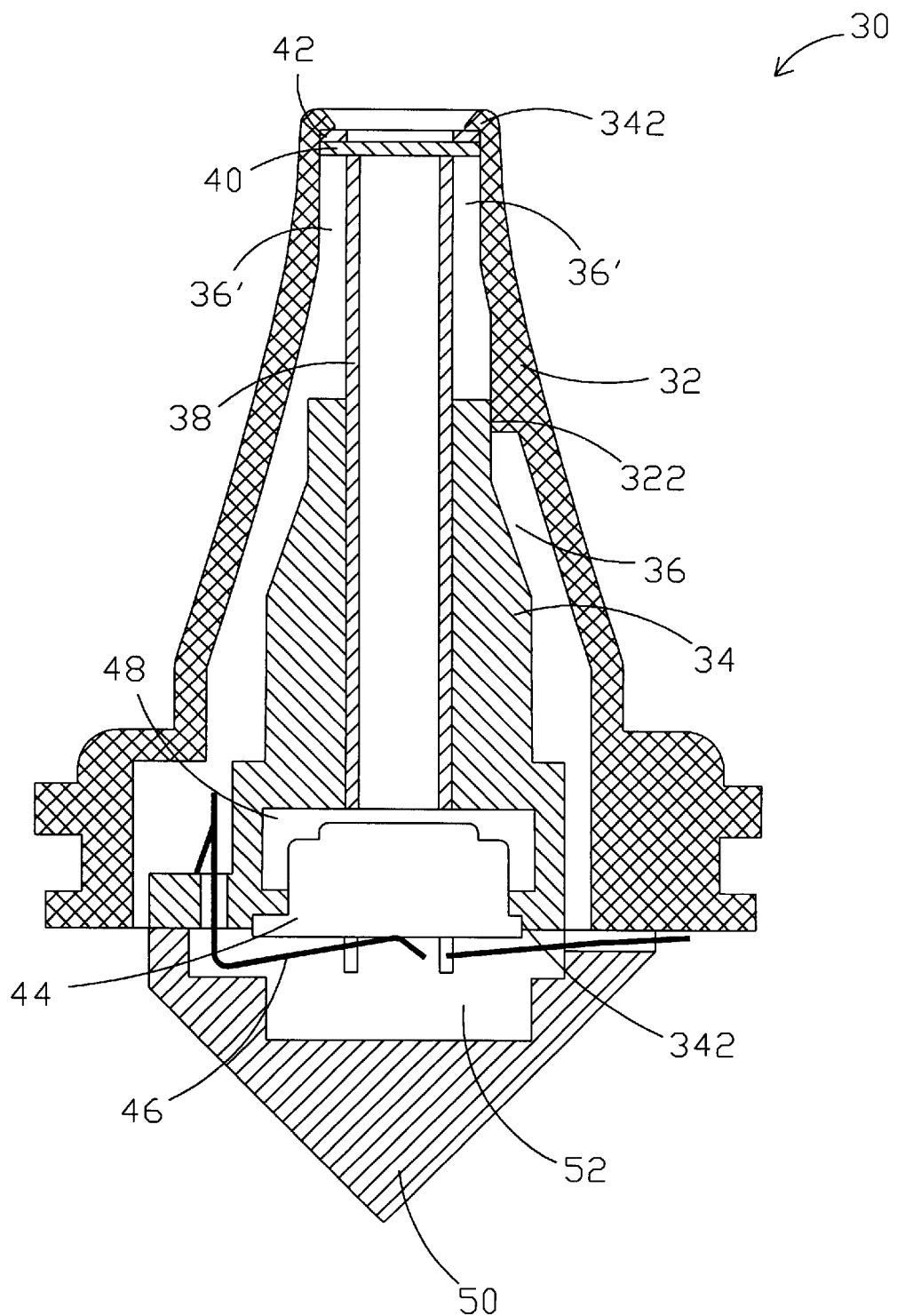
FIG. 4 is a cross-sectional view of an ear thermometer probe structure of the present invention.
Figure 6:
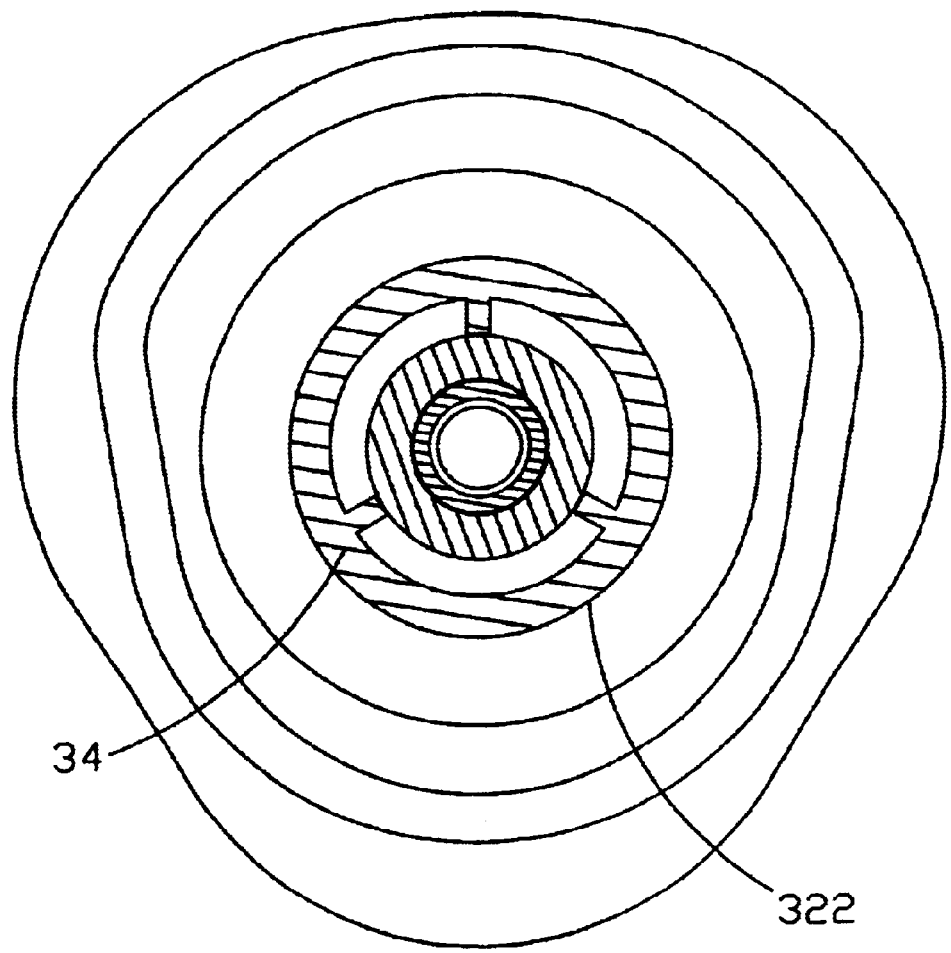
FIG. 6 is a cross sectional top view of the present invention illustrating the location of the three annularly spaced positioning flanges.

As shown in FIGS. 3 and 4, an ear thermometer probe structure 30 is a front end structure of an ear thermometer. The probe structure 30 comprises a shell body 32, which has a narrower front end and a wider rear end to form a probe shape. The shell body 32 is made of plastic material having low thermal conductance, which can be acrylonitrile-butadiene-styrene (ABS), glass fiber, or their mixture. Three positioning flanges 322 are disposed on the inner wall of the shell body 32. An annular positioning flange 324 is formed at the top of the shell body 32. A hollow thermal absorption component 34 made of Al—Zn alloy is disposed in the shell body 32. The thermal absorption component 34 contacts the positioning flanges 322 of the shell body 32 to position and calibrate the center, as shown in FIG. 6. Except contacting three points of the shell body 32, the thermal absorption component 34 does not contact the shell body 32 to form air gaps 36 and 36'. An annular retaining groove 342 is disposed at the rear end of the thermal absorption component 34 to retain a sensor 44. A wave guide 38 is disposed in the hollow portion of the thermal absorption component 34. The rear section of the wave guide 38 tightly contacts the thermal absorption component 34 for to fixation. The front section of the wave guide 38 protrudes out of the thermal absorption component 34 and is separated from the shell body 32 by the air gap 36'. The inner wall of the wave guide 38 is plated with a layer of gold having high reflectance to let infrared rays be transmitted.

A filter 40 is disposed in the shell body 32 and at the front end of the wave guide 38. The periphery of the filter 40 contacts the shell body 32. The filter 40 is made of a silicon chip having high transmittance of infrared rays. The surface of the silicon chip is coated with multiple layers of films to let infrared rays of wavelengths 7~14 um emitted by the human body have optimal transmittances and to filter out light of other wavelengths as more as possible. Therefore, infrared rays can be transmitted through the filter 40 and enter the wave guide 38. An annular sealing pad 42 is disposed between the filter 40 and the annular flange 324 at the top of the shell body 32. The two surfaces of the annular sealing pad 42 tightly contact the filter 40 and the annular flange 324, respectively to achieve dust-proof, water-proof, and vibration-proof effects. The sensor 44 is disposed behind the wave guide 38. An elastic fixing sheet 46 made of metallic material is used to press the sensor 44 and let the sensor be tightly stuck in the annular retaining groove 342 of the thermal absorption component 34 for floating positioning. The sensor 44, the thermal absorption component 34, and the wave guide 38 are separated by an annular air room 48. A thermal discharge component 50 is disposed behind the sensor 44. The thermal discharge component 50 and the thermal absorption component 34 form an annular contact, and are fixedly connected together with screws. An airtight air room 52 is formed between the sensor 44 and the thermal discharge component 50 to only allow thermal radiation having the lowest speed of thermal conductivity but block thermal conductivity and thermal convection. The thermal capacity of the thermal discharge component 50 is larger than that of the thermal absorption component 34 to absorb heat energy in the thermal absorption component 34 and then discharge it.

Figure 5:
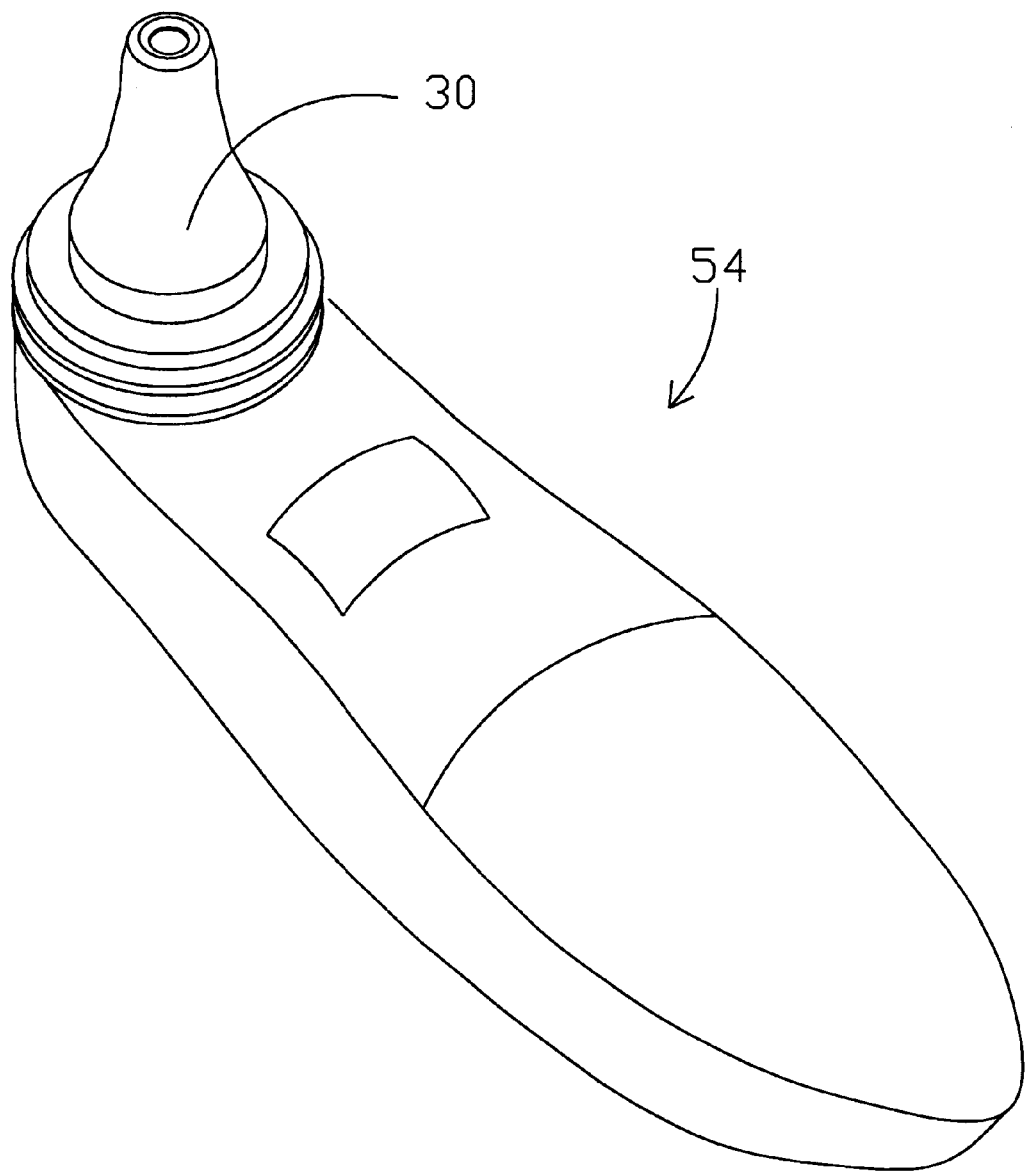
FIG. 5 is a perspective view of the present invention installed on an ear thermometer.

As shown in FIG. 5, the ear thermometer probe structure 30 is installed at the front end of an ear thermometer 54. When in use, the probe structure 30 is stuck into the ear hole. Heat energy released by the eardrum in the ear hole passes through the filter 40 with the form of infrared rays of wavelengths 714 um and then enters the wave guide 38. Infrared rays are totally reflected in the wave guide 38 and reach the sensor 44, which receives the infrared signal and quantizes it into a temperature value to be compared with the temperature of the sensor itself, thereby obtaining a measured temperature for display.

Except that a small section of the sensor 44 contacts the annular retaining groove 342 of the thermal absorption component 34, the sensor 44 is almost located in the annular sealed air rooms 48 and 52. Moreover, except contacting the three positioning points of the shell body 32, the thermal absorption component 34 is separated from the shell body 32 by the sealed air gaps 36 and 36'. Therefore, the opportunity that external heat energy is conducted to the sensor 44 by thermal conductivity and thermal convection will be greatly reduced. The sensor 44 thus will not be easily influenced by the external temperature. Users can be relieved to measure the eardrum temperature of infants without worrying about the hazard of too late medical treatment due to misjudgment by inaccurate measured temperature.

On the other hand, the filter 40 is made of silicon chip material of high strength. Even the filter 40 is pierced by pointed objects, it will not be easily penetrated through or hollowed and deformed as occurred in the film of PP or PE material in the prior art. Therefore, normal transmittance of infrared rays can be kept to avoid erroneous temperature calculation of the ear thermometer due to variation of the transmittance of infrared rays. Moreover, because both the filter 40 of silicon material and the sealing pad 42 at the front end thereof have airtight and waterproof characteristics, the probe of the ear thermometer can be directly cleaned with alcohol for sterilization, and can be used without probe covers.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. An ear thermometer probe structure forming a front end structure of an ear thermometer, said ear thermometer probe structure comprising:

a shell body having a narrower front end and a wider rear end to form a probe shape, three annularly spaced positioning flanges disposed on an inner wall of said shell body, and an annular flange formed at said front end of said shell body;

a hollow thermal absorption component disposed in said shell body and having an upper end portion contacting said positioning flanges of said shell body, other than at said positioning flanges said hollow thermal absorption component being separated from said shell body by an air gap said hollow thermal absorption component having an annular retaining groove formed in a rear end thereof;

a wave guide disposed in said hollow thermal absorption component, a rear section of said wave guide tightly contacting said thermal absorption component, a front section of said wave guide protruding out of said thermal absorption component and being separated from said shell body by an air gap;

a filter disposed on said shell body and located at a front end of said wave guide, said filter having a periphery thereof contacting said shell body and permitting infrared rays to be transmitted therethrough and enter said wave guide;

an annular sealing pad disposed adjacent said annular flange of said shell body and being located between said filter and said annular flange; and, a sensor disposed behind said wave guide and having a portion thereof fixed on to said annular retaining groove of said thermal absorption component, said sensor being separated from a remaining portion of said thermal absorption component and said wave guide by an annular air room.

2. The ear thermometer probe structure as claimed in claim 1, further comprising a thermal discharge component disposed behind said sensor, said thermal discharge component and said thermal absorption component forming an annular contact therebetween and are fixedly connected together.

3. The ear thermometer probe structure as claimed in claim 2, wherein said thermal absorption component and said thermal discharge component are made of Al—Zn alloy.

4. The ear thermometer probe structure as claimed in claim 2, wherein an airtight air room is formed between said sensor and said thermal discharge component.

5. The ear thermometer probe structure as claimed in claim 1, wherein said shell body is made of plastic material of low thermal conductance.

6. The ear thermometer probe structure as claimed in claim 1, wherein said shell body is formed of a material selected from the group consisting of acrylonitrile-butadiene-styrene, glass fiber, and mixtures thereof.

7. The ear thermometer probe structure as claimed in claim 1, wherein said wave guide is made of material of high reflectance.

8. The ear thermometer probe structure as claimed in claim 1, wherein an inner wall of said wave guide is plated with a layer of gold.

9. The ear thermometer probe structure as claimed in claim 1, wherein the material of said sealing pad has a high transmittance of infrared rays.

10. The ear thermometer probe structure as claimed in claim 1, wherein said filter is made of a silicon chip.

11. The ear thermometer probe structure as claimed in claim 10, wherein the surface of said silicon chip is coated with several layers of films.

12. An ear thermometer probe structure forming a front end structure of an ear thermometer, said ear thermometer probe structure comprising:

a shell body having a narrower front end and a wider rear end to form a probe shape, at least one positioning point disposed on an inner wall of said shell body, and an annular flange formed at the front end of said shell body;

a hollow thermal absorption component disposed in said shell body and contacting said positioning point of said shell body, and an air gap being formed at portions of said hollow thermal absorption component not contacting said shell body;

a wave guide disposed in said hollow thermal absorption component, a rear section of said wave guide tightly contacting said thermal absorption component, a front section of said wave guide protruding out of said thermal absorption component and being separated from said shell body by an air gap;

a filter disposed in said shell body and located at a front end of said wave guide, said filter having a periphery thereof contacting said shell body and permitting infrared rays to be transmitted therethrough and enter said wave guide;

an annular sealing pad disposed adjacent said annular flange of said shell body and being located between said filter and said annular flange;

a sensor disposed behind said wave guide and fixed on said thermal absorption component, said sensor being separated from said thermal absorption component and said wave guide by an annular air room; and, an elastic fixing sheet pressing said sensor against said thermal absorption component to provide a floating positioning of said sensor.

13. The ear thermometer probe structure as claimed in claim 12, wherein said elastic fixing sheet is made of metallic material.

* * * * *